G. Upton,
Making Glue,
Nº 60,968. Patented Jan. 1, 1867.
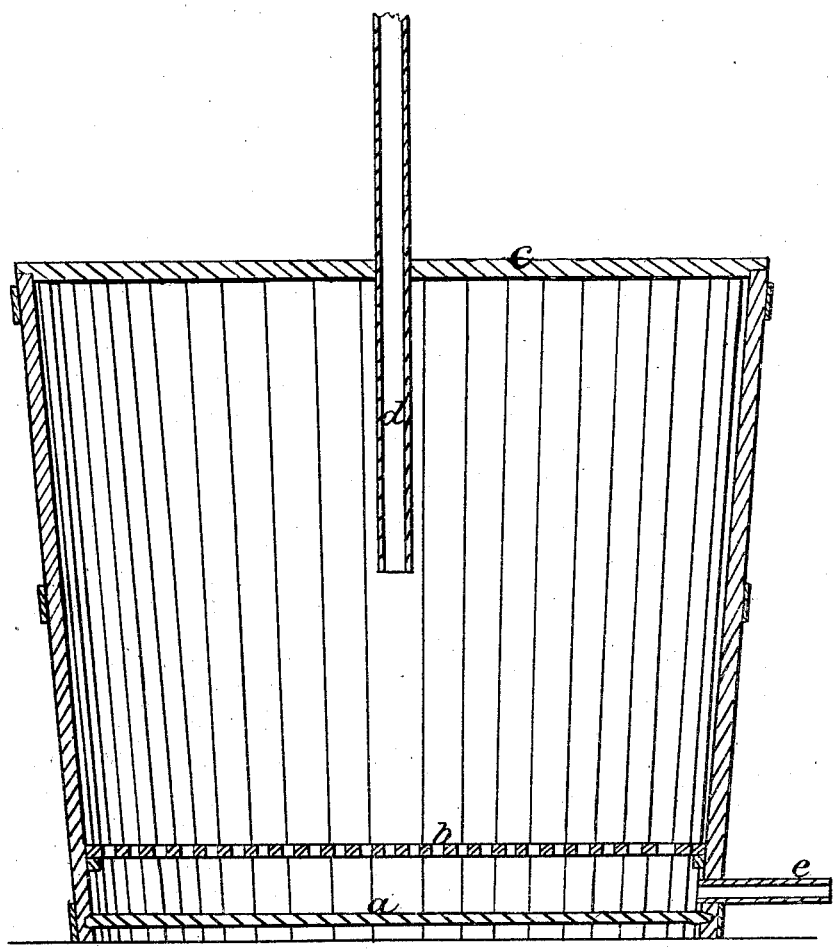
Witnesses
S. B. Kidder.
M. W. Frothingham
Inventor
George Upton
by his Attys
Crosby & Gould

United States Patent Office.

GEORGE UPTON, OF SOUTH DANVERS, MASSACHUSETTS.

Letters Patent No. 60,968, dated January 1, 1867.

IMPROVEMENT IN THE MANUFACTURE OF GLUE.

The Schedule referred to in these Letters Patent and making part of the same.

TO ALL WHOM IT MAY CONCERN:

Be it known that I, GEORGE UPTON, of South Danvers, in the county of Essex, and State of Massachusetts, have invented an Improvement in the Manufacture of Glue; and I do hereby declare that the following, taken in connection with the drawings which accompany and form part of this specification, is a description of my invention sufficient to enable those skilled in the art to practise it.

In the manufacture of glue by subjecting the glue-making material to the action of steam, the common practice is to bring the steam directly into contact with the materials at the bottom of an open tub charged with skins or other animal matters, the steam being introduced through the perforations of a false bottom, and so that its immediate action is upon the materials resting upon said perforated bottom. Now as the glue liquor is drawn off at or just below the bottom of the tub, and as the action of the steam tends to keep the materials in a considerable state of agitation or disturbance at this point, and as the residuous matter settles down to the bottom, the consequence is that the resultant glue is not clear, but has intermixed with it more or less grounds and undissolved matter.

The object of my invention is to so subject the glue material in the tub to the action of the steam that the liquid glue may be drawn in a continuous stream from the tub, and in a clear liquid form, free from deleterious matter; and the process by which I accomplish this constitutes my invention. The process will be more clearly understood by reference to the accompanying drawing, representing a vertical section of the glue-making tub or steam vessel, provided with a close bottom, $a$, and a false or perforated bottom, $b$, some distance above the same, the animal matters being supported upon this perforated bottom, the space below which forms a receptacle for the glue liquor settling through the perforations. To the top of the tub or vessel is applied a steam-tight cover, $c$, through which may pass the steam pipe $d$. Now, instead of debouching this pipe into the tub just at or below the perforated bottom, I debouch it directly into the tub at some distance above the perforated bottom, preferably at or somewhere near the top part thereof, so that the direct action of the steam is upon the materials in the upper part of the vessel, while the general action and pressure of the steam dissolve the materials throughout the vessel without agitation of the matter at the bottom thereof. By these means I am enabled to draw off the settling glue liquor at the pipe or cock $e$, in a perfectly clean condition, and so as to obtain therefrom glue of amber appearance, having no grounds or undissolved matter contained in it.

I claim, in the manufacture of glue, the process of subjecting the gelatinous matters to the action of steam, substantially as set forth.

GEO. UPTON.

Witnesses:
G. A. C. SMITH,
F. GOULD.